(12) United States Patent
Starzengruber et al.

(10) Patent No.: US 9,919,376 B2
(45) Date of Patent: Mar. 20, 2018

(54) METHOD FOR CONTROLLING A BATTERY-POWERED WELDING DEVICE, AND BATTERY-POWERED WELDING DEVICE

(71) Applicant: Fronius International GmbH, Pettenbach (AT)

(72) Inventors: Andreas Starzengruber, Bad Wimsbach-Neydharting (AT); Alexander Speigner, Kirchdorf (AT)

(73) Assignee: Fronius International GmbH, Pettenbach (AT)

( * ) Notice: Subject to any disclaimer, the term of this patent is extended or adjusted under 35 U.S.C. 154(b) by 198 days.

(21) Appl. No.: 14/649,249

(22) PCT Filed: May 21, 2014

(86) PCT No.: PCT/AT2014/050121
§ 371 (c)(1),
(2) Date: Jun. 3, 2015

(87) PCT Pub. No.: WO2014/186815
PCT Pub. Date: Nov. 27, 2014

(65) Prior Publication Data
US 2015/0314387 A1    Nov. 5, 2015

(30) Foreign Application Priority Data

May 23, 2013  (AT) .................................. 50352/2013

(51) Int. Cl.
*B23K 9/09* (2006.01)
*B23K 9/10* (2006.01)
(Continued)

(52) U.S. Cl.
CPC .......... *B23K 9/1043* (2013.01); *H02M 3/1582* (2013.01); *B23K 9/1081* (2013.01); *H02J 7/0063* (2013.01)

(58) Field of Classification Search
CPC .......... B23K 9/09; B23K 9/10; B23K 9/1081; H02M 3/158; H02M 3/1582; H02J 7/0063
(Continued)

(56) References Cited

U.S. PATENT DOCUMENTS

| 8,089,253 B2 | 1/2012 | Murtojärvi |
| 2004/0027101 A1* | 2/2004 | Vinciarelli .......... H02M 3/1582 323/259 |

(Continued)

FOREIGN PATENT DOCUMENTS

| CN | 101689806 A | 3/2010 |
| CN | 103001511 A | 3/2013 |

(Continued)

OTHER PUBLICATIONS

Chinese Office Action in CN 201480004510.4 dated Nov. 2, 2016.
(Continued)

*Primary Examiner* — Michael LaFlame, Jr.
(74) *Attorney, Agent, or Firm* — Collard & Roe, P.C.

(57) ABSTRACT

A method controls a battery-powered welding device and a battery-powered welding device includes a battery having a battery voltage and a battery current and a welding controller containing a boost converter having at least a switch and a buck converter having at least one switch for controlling a welding current and a welding voltage supplied to a welding torch. A switch for bypassing the booster converter is connected to a switch controller designed to close the switch if the intermediate circuit voltage between the boost converter and the buck converter is less than or equal to the (Continued)

battery voltage and to open the switch if the boost converter is activated.

16 Claims, 4 Drawing Sheets

(51) Int. Cl.
  *H02M 3/158* (2006.01)
  *H02J 7/00* (2006.01)
(58) Field of Classification Search
  USPC .......... 219/130.1, 108, 133, 121.45, 121.54, 219/121.39; 323/266
  See application file for complete search history.

(56) References Cited

U.S. PATENT DOCUMENTS

| | | | | |
|---|---|---|---|---|
| 2004/0069752 A1* | 4/2004 | Ulrich | .................. | B23K 10/006 219/121.39 |
| 2005/0109748 A1* | 5/2005 | Albrecht | .............. | B23K 9/1056 219/130.1 |
| 2005/0263514 A1 | 12/2005 | Albrecht | | |
| 2008/0210676 A1* | 9/2008 | Lambirth | .................. | B23K 9/10 219/130.1 |
| 2008/0278136 A1 | 11/2008 | Murtojarvi | | |
| 2009/0179613 A1* | 7/2009 | Masho | .................... | H02J 7/345 320/103 |
| 2009/0236917 A1 | 9/2009 | Bettenwort et al. | | |
| 2010/0156175 A1 | 6/2010 | Wei | | |
| 2011/0114607 A1 | 5/2011 | Albrecht et al. | | |
| 2013/0093514 A1* | 4/2013 | Xu | ...................... | H02M 3/1582 330/129 |
| 2013/0127355 A1* | 5/2013 | Kumar | ................. | H05B 41/042 315/200 R |
| 2014/0167652 A1* | 6/2014 | King | ........................ | F21V 23/02 315/307 |
| 2014/0253056 A1* | 9/2014 | Hu | ........................ | H02M 3/158 323/205 |
| 2015/0042345 A1* | 2/2015 | Cooper | .............. | G01R 19/0092 324/405 |

FOREIGN PATENT DOCUMENTS

| | | |
|---|---|---|
| EP | 0 825 059 A2 | 2/1998 |
| EP | 1 535 691 A2 | 6/2005 |
| EP | 2 104 200 A1 | 9/2009 |
| EP | 1 981 676 B1 | 4/2014 |
| JP | H01-157265 A1 | 6/1989 |
| WO | 2008/135637 A1 | 11/2008 |

OTHER PUBLICATIONS

Japanese Examination Report in JP 2015-556339, dated Jul. 5, 2016, with English translation.
International Search Report of PCT/AT2014/050121, dated Jan. 23, 2015.
Austrian Office Action in A 50352/2013-1, dated May 13, 2014, with an English translation of relevant parts.

* cited by examiner

METHOD FOR CONTROLLING A BATTERY-POWERED WELDING DEVICE, AND BATTERY-POWERED WELDING DEVICE

CROSS REFERENCE TO RELATED APPLICATIONS

This application is the National Stage of PCT/AT2014/050121 filed on May 21, 2014, which claims priority under 35 U.S.C. § 119 of Austrian Application No. A 50352/2013 filed on May 23, 2013, the disclosure of which is incorporated by reference. The international application under PCT article 21(2) was not published in English.

The invention relates to a method for controlling a battery-powered welding device, wherein the battery voltage provided by a battery and the battery current are controlled to a welding current and a welding voltage supplied to a welding torch by means of a welding controller containing a boost converter having at least one switch and a buck converter having at least one switch.

Furthermore, the invention relates to a battery-powered welding device comprising a battery having a battery voltage and a battery current and comprising a welding controller containing a boost converter having at least one switch and a buck converter having at least one switch for controlling a welding current and a welding voltage supplied to a welding torch.

For particularly hard-to-reach locations where welding is to be performed, for example on a scaffold, or for welding where direct supply of electric power is not possible, for example in a boiler, using portable battery-powered welding devices is especially advantageous or essential. Most prior art battery-powered welding devices exhibit limitations with regard to the quality of welding to be achieved therewith since the welding performance to be achieved and the dynamics to be achieved are lower than with mains-powered welding devices.

EP 1 535 691 B1 describes a portable welding device having a replaceable battery containing a combination of a boost converter and a buck converter in order to be able to achieve a higher welding current and a higher welding voltage. Since mainly the buck converter is active during normal welding operation, however, the provided boost converter causes an increase in the total losses of the battery-powered welding device and, thus, a decrease in efficiency.

Battery-powered welding devices are also known from EP 1 981 676 B1, US 2011/0114607 A1 and US 2005/0263514 A1, for example.

The object of the present invention is to provide a method of the above type and a battery-powered welding device of the above type, which achieve efficiency and dynamics as high as possible and make it possible to obtain optimal welding characteristics. Drawbacks of known battery-powered welding devices are to be eliminated or at least reduced.

Regarding the method, the object according to the invention is achieved by bypassing the boost converter by means of a switch controlled by a switch controller when the intermediate circuit voltage between the boost converter and the buck converter is less than or equal to the battery voltage, and by opening the switch for bypassing the boost converter when the boost converter is activated. Due to the bypassing of the boost converter according to the invention under certain preconditions, the losses of the boost converter circuit may be minimised when the boost converter is not needed. In this case, only the conduction losses of the switch for bypassing the boost converter need to be considered for the effectiveness of the overall system. According to the specified turn-on and turn-off condition for the bypass switch, the boost converter is bypassed when the intermediate circuit voltage between the boost converter and the buck converter is less than or equal to the battery voltage. From this threshold on, boosting the voltage is no longer required, so the boost converter may be deactivated and bypassed. The turn-off condition for the switch for bypassing the boost converter is met when the boost converter is active, i. e. required for boosting the battery voltage. The present controlling method is characterised by particular simplicity and causes an increase in efficiency of the battery-powered welding device.

According to another feature of the invention, opening the switch for bypassing the boost converter is to happen when the welding current is less than the maximum current through the boost converter and the buck converter is deactivated. This turn-off condition for the bypass switch is met when the current drops below the maximum current that the boost converter can supply and the buck converter is deactivated, i. e. the at least one switch of the buck converter is switched.

In order to increase the dynamics of the method for controlling a battery-powered welding device, it is provided that the boost converter is deactivated when the welding voltage is less than the battery voltage minus a certain voltage, in particular 2 V. This regulation condition for the boost converter allows deactivating the boost converter even when the intermediate circuit voltage is higher than the battery voltage and the bypass switch is still turned on. Furthermore, it is advantageous for the boost converter not to be deactivated via the above regulation condition before a certain time for turning on has elapsed. This minimum time for turning on, which may be 10 periods of the clock frequency used, for example, may make it possible to avoid oscillations and to load capacitors.

Advantageously, the boost converter is controlled via a regulation by comparing the intermediate circuit voltage to a desired welding voltage and comparing this comparison value and the current through the boost converter by means of a comparator and supplying it to the regulation. By comparing the regulation output (from the comparison of the intermediate circuit voltage to the set desired welding voltage) to the boost converter current by means of an analogue comparator, the speed required for the desired dynamics may be obtained, which would not be possible via digital processing via an analogue-to-digital converter and corresponding software processing.

Preferably, the at least one switch of the boost converter and the at least one switch of the buck converter, which are usually formed by appropriate field-effect transistors, are operated at the same clock frequency, preferably 40 to 50 kHz.

For the dynamics of the method and/or the circuit, it is advantageous if the intermediate circuit voltage is measured only during part of each period duration of the clock frequency and evaluated during the remainder of each period duration. For example, the intermediate circuit voltage is measured multiple times during the measuring phase, and the calculated mean value is then evaluated during the evaluating phase, and the controlling is carried out accordingly.

The boost converter is preferably operated as a voltage regulator whereas the buck converter is preferably operated as a current regulator.

During normal welding operation, only the buck converter is activated and the boost converter is bypassed via the switch. In this case, the welding voltage and/or the arc voltage is less than the battery voltage, so boosting the battery voltage is not required. Typically, a welding voltage of approx. 30 V is sufficient during normal welding operation, so if there is a battery voltage in the range of 50 to 60 V, decreasing the battery voltage to said 30 V may be done. Since output voltages of 70 to 90 V are required for an optimal ignition of the welding process, i. e. higher ones than said battery voltage of 50 to 60 V, the battery voltage needs to be increased to the respective higher value. An advantage of battery voltages less than 60 V is that many safety precautions are not required.

During the ignition process, for example, both the boost converter and the buck converter are activated, which is regulated by the condition of the desired welding current being less than the maximum current through the boost converter. This means that both the boost converter and the buck converter work in those load ranges where the desired welding voltage is below the maximum current that the boost converter can supply.

By operating the combination of boost converter and buck converter in the opposite direction, loading the battery may be performed via the output path in a simple manner.

The object according to the invention is also achieved by a battery-powered welding device as mentioned above, in which a switch for bypassing the boost converter is provided, which switch is connected to a switch controller, which switch controller is designed to close the switch when the intermediate circuit voltage between the boost converter and the buck converter is less than or equal to the battery voltage and to open the switch when the boost converter is activated. For the advantages that may be achieved by this, reference is made to the above description of the controlling method. The respective additional components for the battery-powered welding device may be produced in a relatively simple and economical way. The switch for bypassing the boost converter, for example. is preferably formed by a field-effect transistor.

Preferably, the switch controller is also designed to open the switch for bypassing the boost converter when the welding current is less than the maximum current through the boost converter and the buck converter is deactivated.

Preferably, a regulation for the boost converter is provided, which is designed to deactivate the boost converter when the welding voltage is less than the battery voltage minus a predetermined voltage, in particular 2 V. This regulation condition allows deactivating the boost converter, wherein a minimum time for turning on may also be provided for the deactivation in order to avoid oscillations.

If a comparator for comparing a comparison value of the intermediate circuit voltage to a desired welding voltage and the current through the boost converter is provided, which comparator is connected to the regulation for regulating the boost converter, an optimisation with regard to dynamics may be achieved.

It is advantageous to provide a battery having a battery voltage of less than or equal to 60 V. By going below this safety extra-low voltage, many safety precautions and/or measures may be omitted.

If a capacitor is arranged between the boost converter and the buck converter, the increase in voltage may be restricted. The capacitor is sized such that a minimum capacity is given for avoiding a not excessively high ripple current and/or a not excessively high voltage increase per period. This is particularly relevant when turning off the boost converter. Furthermore, too high a capacity is unfavourable for achieving a fast reaction/dynamics.

The switch for bypassing the boost converter is preferably formed by a field-effect transistor. This allows keeping conduction end losses during switching of the switch particularly low.

The battery is preferably formed by a lithium iron phosphate battery, which exhibits both a particularly high power density and high safety at the same time and is therefore especially suited for use in a portable welding device.

As has already been mentioned above, it is advantageous if the buck converter is usable in the opposite direction as a boost converter for loading the battery.

The present invention will be discussed in more detail by means of the attached drawings. In the drawings.

Figure 1:
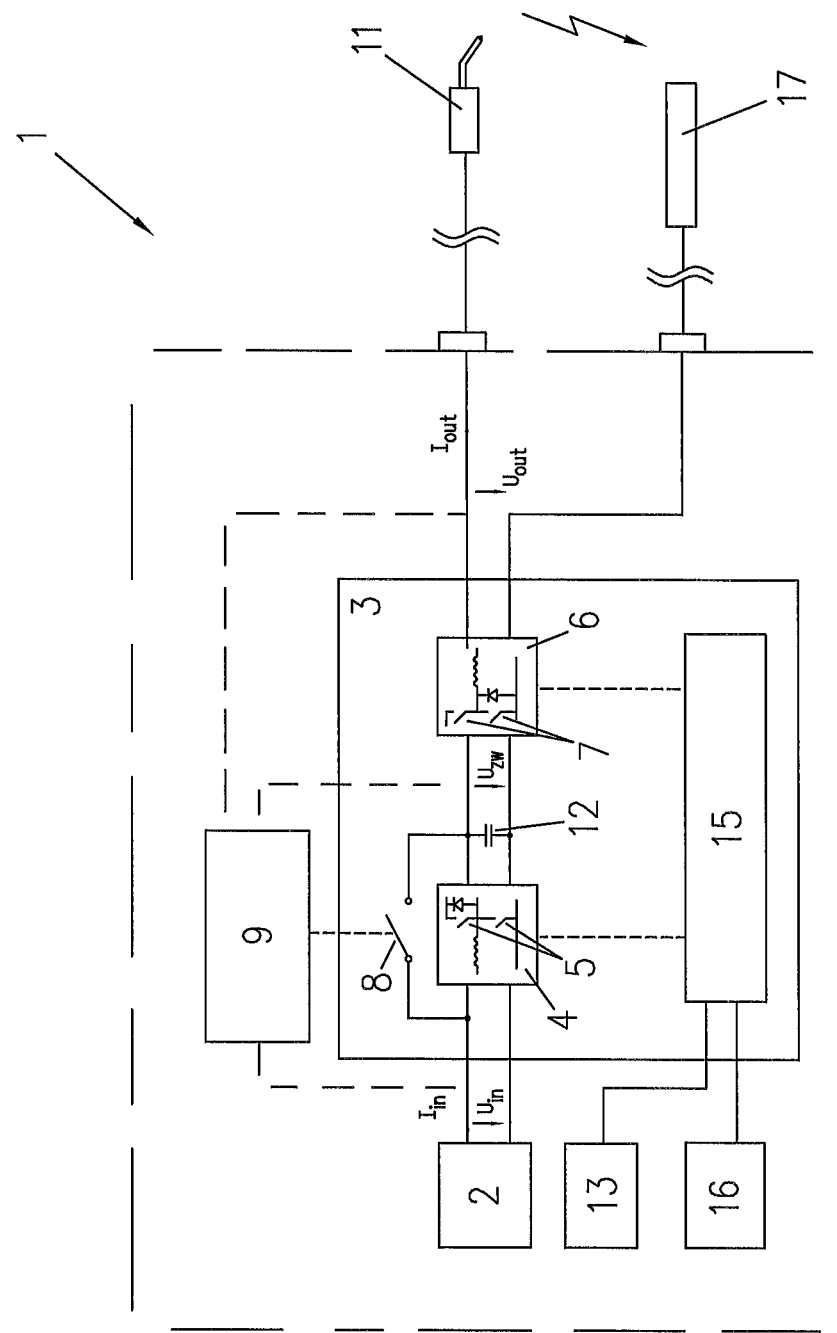
FIG. 1 shows a block diagram of a battery-powered welding device according to the present invention.

FIG. 1 shows a block diagram of a battery-powered welding device 1 having a battery 2, which may be formed, for example, by a lithium iron phosphate battery having a particularly high power density. If desired, the battery 2 may also be designed replaceable. The battery 2 supplies a battery voltage $U_{in}$ and a battery current $I_{in}$. In a welding controller 3, the battery voltage $U_{in}$ provided by the battery 2 and the battery current $I_{in}$ are controlled to a respective welding current $I_{out}$ supplied to a welding torch 11 and a welding voltage $U_{out}$ supplied to the welding torch 11. The outputs of the welding controller 3 are connected to the welding torch 11 and the workpiece 17 to be welded. The desired welding current $I_{set}$ and the desired welding voltage $U_{set}$ are set, for example, via an input device 16 and transferred to the control device 15. The control device 15 supplies the respective control signals for the components contained in the welding controller, the boost converter 4 having at least one switch 5 and the buck converter 6 having at least one switch 7. Furthermore, the control device 15 may be connected to a display 13 for displaying the most important operating parameters or the like. If required, the battery voltage $U_{in}$ supplied by the battery 2 is changed to a respectively higher value $U_{out}$ by the boost converter 4; during normal welding operation, only the buck converter 6 is usually active, changing the battery voltage $U_{in}$ to a respectively lower value of the welding voltage $U_{out}$. In order to reduce the losses during normal welding operation, when only the buck converter 6 of the welding controller 3 is active, a switch 8 for bypassing the boost converter 4 is provided. The turn-on condition for the switch 8 is met when the intermediate circuit voltage $U_{zw}$ between the boost converter 4 and the buck converter 6 is less than or equal to the battery voltage $U_{in}$. The turn-off condition for the switch 8 is met when the boost converter 4 is activated by the control device 15. This means that if the battery voltage $U_{in}$ is sufficient for welding operation and the boost converter 4 is not needed, it is bypassed by the switch controller 9 via the switch 8. As a consequence, only the conduction losses of the switch 8 need to be considered during normal welding operation. When choosing an appropriate switch 8, however, in particular a MOSFET, these losses are particularly low. For the basic condition for controlling the switch 8, measuring the intermediate circuit voltage $U_{zw}$ and the battery voltage $U_{in}$ is required. In addition, the output voltage $U_{out}$ may also be considered in the switch controller 9. Typically, the required parameters are digitised by means of analogue-to-digital converters and processed by means of a microprocessor contained in the switch controller 9. A capacitor 12 is usually provided between the boost converter 4 and the buck converter 6.

According to a further turn-off condition of the switch 8 for bypassing the boost converter 4, the welding current $I_{out}$ is compared to the maximum current $I_{b,max}$ through the boost converter 4, and the switch 8 is opened if the welding current $I_{out}$ is less than the maximum current $I_{b,max}$ through the boost converter 4 and the buck converter 6 is deactivated.

The boost converter 4 is deactivated if the welding voltage $U_{out}$ is less than the battery voltage $U_{in}$ minus a predetermined voltage, for example 2 V. In this case, the welding voltage $U_{out}$ and/or the arc voltage is less than the battery voltage $U_{in}$ minus the predetermined voltage value, so only the buck converter operates.

The switches 5 and 7 of the boost converter 4 and the buck converter 6, respectively, are preferably formed by MOSFETs and are operated at the same switching frequency of preferably 40 to 50 kHz. The boost converter 4 is operated in a voltage-regulated manner whereas the buck converter 6 is operated in a current-regulated manner.

If the buck converter 6 is used in the opposite direction, as a boost converter 4, the battery 2 may be loaded via the connections for the welding torch 11 and the workpiece 17.

Figure 2:
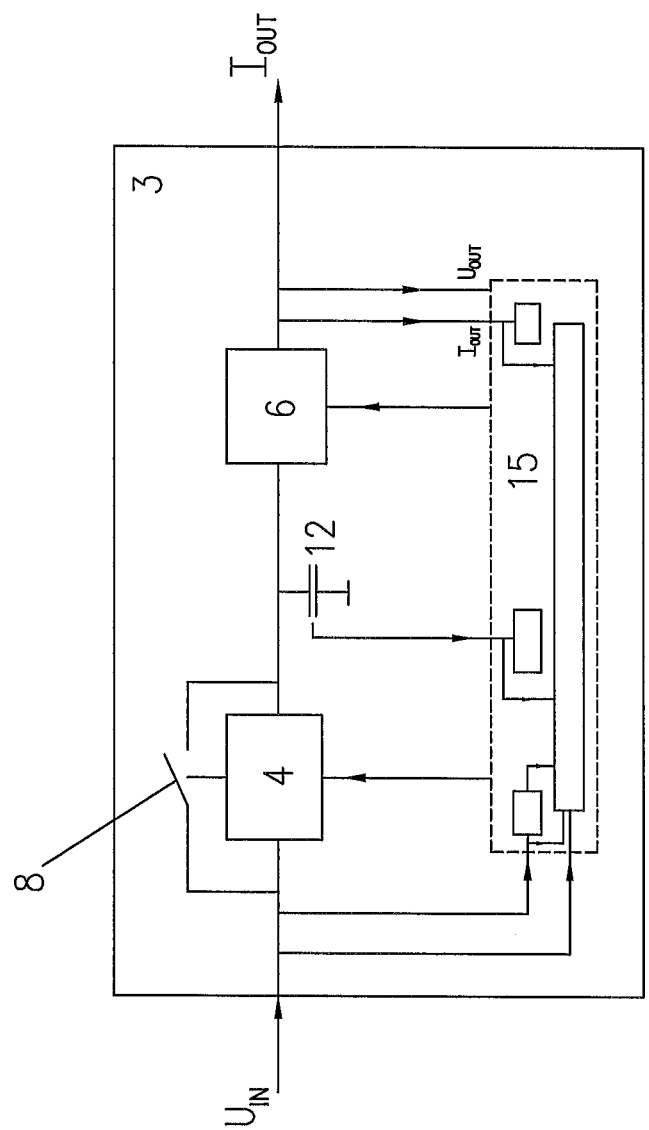
FIG. 2 shows an expanded block diagram of a welding controller for a battery-powered welding device of the present type.

FIG. 2 shows a detailed block diagram of the welding controller 3 of the battery-powered welding device 1, wherein the control device 15 has the respective input parameters
$U_{in}$ battery voltage
$I_b$ current through the boost converter 4
$U_{zw}$ intermediate circuit voltage
$U_{out}$ welding voltage
$I_{out}$ welding current
$U_{set}$ set and/or desired welding voltage
$I_{set}$ set and/or desired welding current The corresponding data is obtained by hardware for regulating the boost converter 4 in order to be able to reach the speed required for a high-dynamics regulation.

Figure 3:
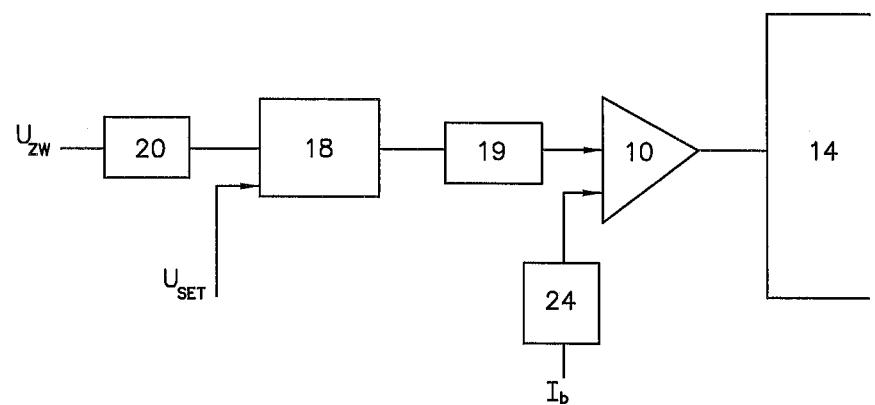
FIG. 3 shows a block diagram of an embodiment of a regulation of a boost converter.

FIG. 3 shows a block diagram of an embodiment of a regulation of the boost converter 4, wherein the intermediate circuit voltage $U_{zw}$ and the set desired welding voltage $U_{set}$ are compared in a control circuit 18 and converted into an analogue comparison value in a digital-to-analogue converter. In a comparator 10, this regulation output and the current $I_b$ flowing through the boost converter 4 are compared and supplied to the regulation 14 of the boost converter 4. The intermediate circuit voltage $U_{zw}$ and the current $I_b$ through the boost converter 4 may be filtered by appropriate filter circuits 20, 21.

Figure 4:
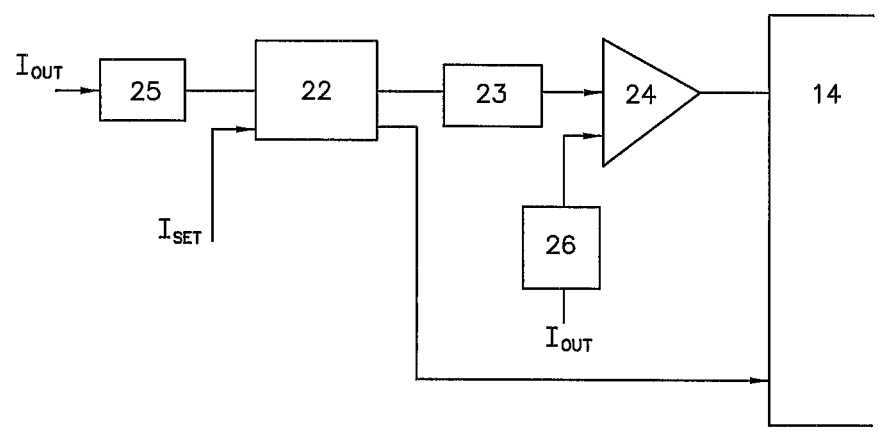
FIG. 4 shows a block diagram of an embodiment of a regulation of the buck converter.

FIG. 4 shows a block diagram of an embodiment of a regulation of the buck converter 6, wherein the input parameters of the welding current $I_{out}$ and the desired set welding current $I_{set}$ are supplied to a controller 22, which is preferably formed by a PID controller. An additionally generated signal responsible for the maximum permissible welding current $I_{out}$ is supplied to a digital-to-analogue converter 23 and then analogously compared to the welding current $I_{out}$ in a comparator 24 and supplied to the regulation 14. Filters 25, 26 can be used here as well.

Figure 5:
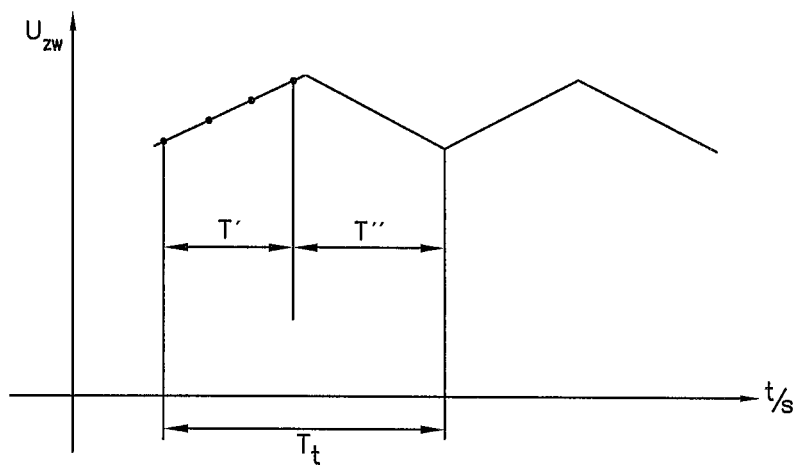
FIG. 5 shows a time diagram for illustrating the manner for determining the intermediate circuit voltage as an input parameter for controlling the switch for bypassing the boost converter.

FIG. 5 shows a time diagram of the intermediate circuit voltage $U_{zw}$ over time, wherein the intermediate circuit voltage $U_{zw}$ is measured only in part of the period of the clock frequency $f_t$. In the example illustrated, the intermediate circuit voltage $U_{zw}$ is measured four times per period $T_t$, and the mean value is determined. This mean value of the intermediate circuit voltage $U_{zw}$ is used to decide, after comparing it to the battery voltage $U_{in}$, whether the switch 8 for bypassing the boost converter 4 is connected through or not. The remainder of the period duration $T_t$, during which the intermediate circuit voltage $U_{zw}$ is not measured, remains for evaluation. In this way, a fast regulation and scanning, which has proven important for a welding process having optimal welding quality, may be performed.

Figure 6:
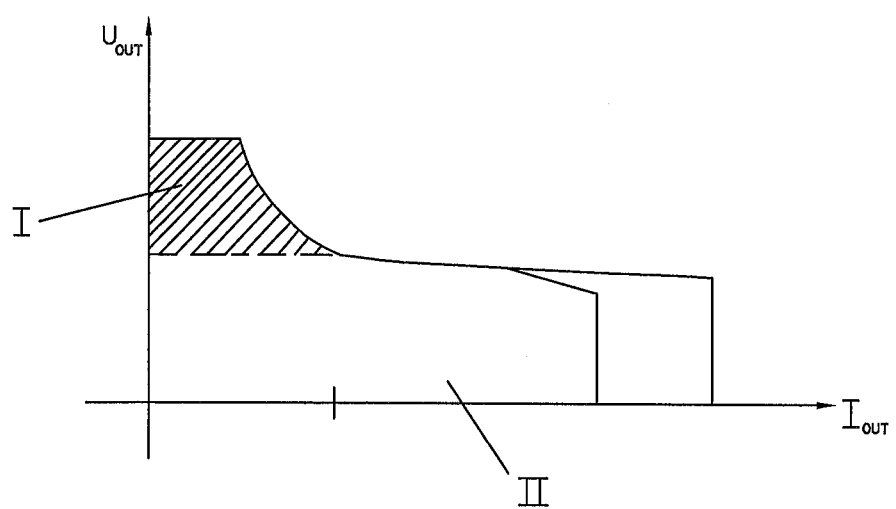
FIG. 6 shows a diagram for visualising the various operation states of the battery-powered welding device having the combination of a boost converter and a buck converter.

Finally, FIG. 6 shows a diagram of the welding voltage $U_{out}$ in relation to the welding current $I_{out}$, wherein both the boost converter 4 and the buck converter 6 operate in the hatched area. In area II, only the buck converter 6 operates. This represents the normal welding state. The envelope according to FIG. 6 shows the maximum values and/or maximum power statically and/or dynamically.

The invention claimed is:

1. A method for controlling a battery-powered welding device comprising:
    providing a battery, the battery providing a battery voltage and a battery current;
    supplying a welding current and a welding voltage to a welding torch;
    providing a welding controller containing a boost converter having a first switch and a buck converter having a second switch, the boost converter being connected to the buck converter via an intermediate circuit connection;
    controlling by the welding controller the battery voltage and the battery current to give the welding current and the welding voltage supplied to the welding torch;
    bypassing the boost converter using a bypass comprising a third switch controlled by a switch controller when an intermediate circuit voltage between the boost converter and the buck converter is less than or equal to the battery voltage, the bypass feeding into the intermediate circuit connection; and
    opening the third switch for bypassing the boost converter when the boost converter is activated;
    wherein the third switch for bypassing the boost converter is opened when the welding current is less than the maximum current through the boost converter and the buck converter is deactivated;
    wherein the first switch of the boost converter and the second switch of the buck converter are operated at the same clock frequency; and
    wherein the intermediate circuit voltage is measured only during part of each period duration of the clock frequency and evaluated during the remainder of each period duration.

2. The method according to claim 1, wherein the boost converter is deactivated when the welding voltage is less than the battery voltage minus a predetermined voltage.

3. The method according to claim 1, wherein the boost converter is regulated via a regulation device by comparing the intermediate circuit voltage to a desired welding voltage and comparing this comparison value and the current through the boost converter by a comparator and supplying it to the regulation device.

4. The method according to claim 1, wherein the boost converter is operated as a voltage regulator.

5. The method according to claim 1, wherein the buck converter is operated as a current regulator.

6. The method according to claim 1, wherein only the buck converter is activated during normal welding operation.

7. The method according to claim 1, wherein both the boost converter and the buck converter are activated if the desired welding current is less than the maximum current through the boost converter.

8. The method according to claim 1, wherein the battery receives unused power back from the buck converter.

9. A battery-powered welding device comprising
a battery having a battery voltage and a battery current,
a welding controller containing a boost converter having a first switch and a buck converter having a second switch for controlling the battery voltage and the battery current to give a welding current and a welding voltage supplied to a welding torch, an intermediate circuit connection connecting the boost converter to the buck converter,
a switch controller, and
a bypass comprising a third switch for bypassing the boost converter, the third switch being connected to the switch controller, the bypass feeding into the intermediate circuit connection,
wherein the switch controller is designed to close the third switch when the intermediate circuit voltage between the boost converter and the buck converter is less than or equal to the battery voltage and to open the third switch when the boost converter is activated,
wherein the switch controller is designed to open the third switch for bypassing the boost converter when the welding current is less than the maximum current through the boost converter and the buck converter is deactivated,
wherein the first switch of the boost converter and the second switch of the buck converter are designed to operate at the same clock frequency, and
wherein the intermediate circuit voltage is measured only during part of each period duration of the clock frequency and evaluated during the remainder of each period duration.

10. The battery-powered welding device according to claim 9, further comprising a regulation device for the boost converter, the regulation device being configured to deactivate the boost converter when the welding voltage is less than the battery voltage minus a predetermined voltage.

11. The battery-powered welding device according claim 10, further comprising a comparator for comparing a comparison value of the intermediate circuit voltage to a desired welding voltage and the current through the boost converter, the comparator being connected to the regulation device for regulating the boost converter.

12. The battery-powered welding device according to claim 9, wherein the battery has a battery voltage less than or equal to 60 V.

13. The battery-powered welding device according to claim 9, further comprising a capacitor arranged in the intermediate circuit connection between the boost converter and the buck converter.

14. The battery-powered welding device according to claim 9, wherein the third switch for bypassing the boost converter is a field-effect transistor.

15. The battery-powered welding device according to claim 9, wherein the battery is a lithium iron phosphate battery.

16. The battery-powered welding device according to claim 9, wherein the buck converter is usable as a loading circuit for loading the battery when operated in the opposite direction.

* * * * *